United States Patent
Vanderveen et al.

(10) Patent No.: US 7,237,541 B2
(45) Date of Patent: Jul. 3, 2007

(54) MODULAR INTAKE MANIFOLD AND INTEGRATED AIR INTAKE SYSTEM

(75) Inventors: James K. Vanderveen, Blenheim (CA); Kevin A. Murphy, Sterling Heights, MI (US); Ki-Ho Lee, Windsor (CA)

(73) Assignee: Siemens Canada Limited, Chatham (CA)

( * ) Notice: Subject to any disclaimer, the term of this patent is extended or adjusted under 35 U.S.C. 154(b) by 0 days.

(21) Appl. No.: 11/233,697

(22) Filed: Sep. 23, 2005

(65) Prior Publication Data

US 2006/0060163 A1 Mar. 23, 2006

Related U.S. Application Data

(60) Provisional application No. 60/612,572, filed on Sep. 23, 2004.

(51) Int. Cl.
*F02M 25/07* (2006.01)
*F02M 35/10* (2006.01)
*F02B 47/08* (2006.01)

(52) U.S. Cl. ............ 123/568.17; 123/184.21; 123/184.61; 123/198 E

(58) Field of Classification Search ............ 123/198 E, 123/184.21, 184.34, 184.42, 184.47, 184.61, 123/568.11, 568.12, 568.15, 568.17, 568.18, 123/563, 572

See application file for complete search history.

(56) References Cited

U.S. PATENT DOCUMENTS

| | | | | | |
|---|---|---|---|---|---|
| 3,237,615 | A | * | 3/1966 | Daigh | 123/568.17 |
| 4,270,508 | A | * | 6/1981 | Lindberg | 123/568.15 |
| 4,300,511 | A | * | 11/1981 | Lang | 123/198 E |
| 4,615,324 | A | * | 10/1986 | Choushi et al. | 123/568.17 |
| 4,693,226 | A | * | 9/1987 | Choma | 123/568.17 |
| 5,427,080 | A | * | 6/1995 | Maeda et al. | 123/568.17 |
| 5,713,323 | A | * | 2/1998 | Walsh et al. | 123/184.42 |
| 5,957,116 | A | * | 9/1999 | Haegele et al. | 123/568.17 |
| 6,089,199 | A | * | 7/2000 | Lohr et al. | 123/184.21 |
| 6,209,529 | B1 | * | 4/2001 | Everingham | 123/568.2 |
| 6,422,221 | B2 | * | 7/2002 | Pietrowski et al. | 123/568.17 |
| 2004/0031460 | A1 | * | 2/2004 | Vanderveen et al. | 123/184.21 |

* cited by examiner

*Primary Examiner*—Willis R. Wolfe, Jr.

(57) ABSTRACT

An intake assembly includes an intake manifold comprising several interfitting sections attached to each other to define a plurality of air passages, and an EGR conduit within the intake manifold including openings in communication with each of the plurality of air passages. The EGR conduit is in communication with a source of exhaust gases and provides for the proximate and decentralized injection of exhaust gases into the intake manifold assembly. The intake manifold assembly also includes a passage that is in communication with a positive crankcase ventilation system (PCV) and a purge gas system. Gases from the PCV system and the gas purge system mix in the passage and then are communicated to the each of the air passages through individual opening passages.

20 Claims, 7 Drawing Sheets

MODULAR INTAKE MANIFOLD AND INTEGRATED AIR INTAKE SYSTEM

CROSS REFERENCE TO RELATED APPLICATION

The application claims priority to U.S. Provisional Application No. 60/612,572 which was filed on Sep. 23, 2004.

BACKGROUND OF THE INVENTION

This invention relates generally to an intake system for a vehicle. More particularly, this invention is directed toward an air intake system including a decentralized exhaust gas recirculating system.

An intake manifold provides airflow for combination with fuel for combustion within a combustion chamber. The intake manifold is typically mounted to a cylinder head of the engine. A fuel rail provides fuel to the various fuel injectors located at each combustion chamber. An exhaust gas recirculating (EGR) system is provided to utilize and reclaim elements exhausted from a combustion chamber to improve engine efficiencies and overall fuel combustion.

Typically, an EGR valve is mounted to control the flow of exhaust gases through a single opening and into the intake manifold. The exhaust gases then mix with incoming air and fuel and are drawn into the combustion chamber. It is desirable that the exhaust gases injected into the intake manifold are uniformly distributed among the several runners of the intake manifold and ultimately between each of the combustor chambers.

Disadvantageously, injection of exhaust gases are not controlled and are generally not uniformly distributed among the several combustion chambers. Accordingly, each combustion chamber likely receives differing levels of exhaust gases causing non-uniform combustion across the several cylinders.

Further, different covers, and devices for various different system are mounted to the engine, for example, the intake manifold, air cleaner, valve covers, heat shields, wire harness and fuel rails. Each item requires a mounting point or bracket either to the engine or within the engine compartment. Disadvantageously, much time is spent on determining how and where to mount items of each system. Further, in many instances different groups or suppliers are responsible for different systems, requiring coordination of mounting points and brackets as they are related to every other component in the engine compartment.

Accordingly, it is desirable to design and develop an intake assembly that provides improved exhaust gas distribution and that minimizes mounting requirements within an engine compartment.

SUMMARY OF THE INVENTION

An example intake assembly according to this invention includes an intake manifold comprising several interfitting sections attached to each other to define a plurality of air passages, an EGR conduit within the intake manifold including openings in communication with each of the plurality of air passages, and an air filter housing integrally formed with a valve cover.

The example intake manifold assembly includes the electronic throttle body that provides and regulates inlet air. The intake manifold assembly is comprised of a cover, a middle section and a bottom section. Attached to the bottom section is a carrier assembly. The carrier assembly houses full injectors for mixing fuel with air prior to being injected into the combustion chamber.

The intake manifold includes an opening for an EGR conduit. The EGR conduit is in communication with a source of exhaust gases controlled by an EGR valve. The EGR conduit according to this invention provides for the proximate and decentralized injection of exhaust gases into the intake manifold assembly.

The intake manifold assembly also includes a passage that is in communication with a positive crankcase ventilation system (PCV) and a purge gas system. Gases from the PCV system and the gas purge system mix in the passage and then are communicated to the each of the air passages through individual opening passages. This direct and individual communication improves response times of each system.

A tuning valve assembly is provided that includes a plurality of tuning plates supported on a shaft and rotated by an actuator. The tuning plates provide for the further control of airflow through the air passages to further control and optimize performance.

A carrier assembly is attached to the intake manifold and supports a plurality of fuel injectors and the required electrical conduits. The carrier assembly is mounted to the bottom section between the intake manifold assembly and a cylinder head of the engine. Openings of the carrier assembly include a swirl control valve for preferentially imparting a swirl in air and gas flow as it enters the combustion chamber of the engine. Additionally, the carrier assembly can include an air passage that communicates clean air proximate to the fuel injector to aid in the atomization of fuel.

The air filter assembly includes a fresh air tube that supplies air to the air filter housing. A portion of the air filter housing is integrally formed with portions of the valve cover. Air enters the air filter housing through the fresh air tube and exits through the air conduit where it is communicated to the electronic throttle body. The air conduit is molded of a non-metallic material and includes an integrally molding lead frame. The integrally molded lead frame provides for the integration for the wiring harness that communicates with electrical devices of the engine.

These and other features of the present invention can be best understood from the following specification and drawings, the following of which is a brief description.

DETAILED DESCRIPTION OF THE PREFERRED EMBODIMENT

Figure 1:
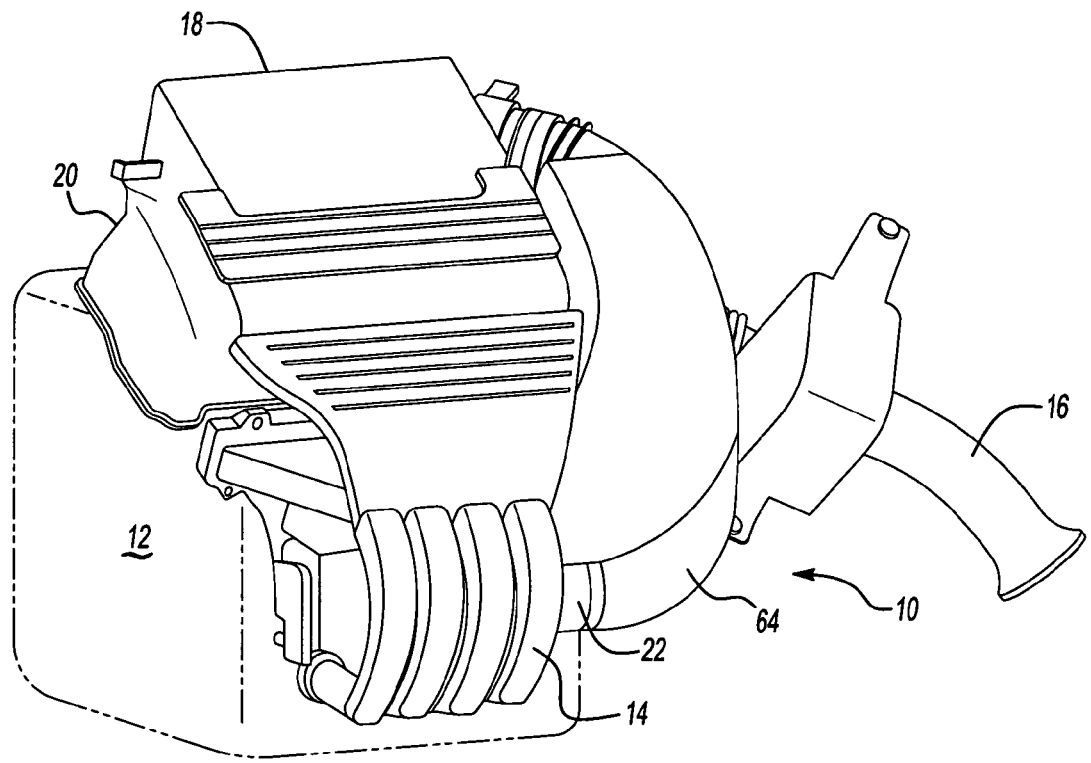
FIG. 1 is a perspective view of an air intake assembly according to this invention.

Referring to FIG. 1, an intake assembly 10 for an automotive engine 12 includes an air intake manifold 14 and an air filter housing 18. The air filter housing 18 is disposed on a valve cover 20. Air enters the air filter housing 18 thru a fresh air tube 16 and exits the air filter housing through a clean air conduit 64 to a throttle valve 22. The intake assembly 10 according to this invention integrates multiple features typically separated and attached to the engine 12 by way of separate mounting means.

Figure 2:
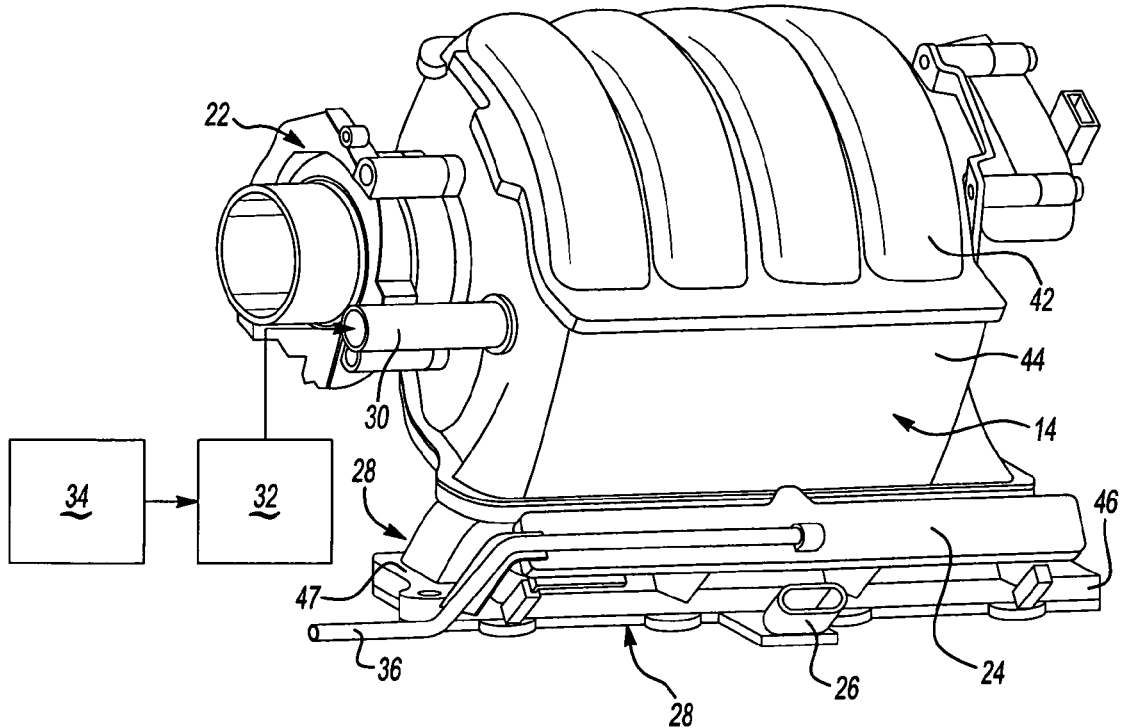
FIG. 2 is a perspective view of the example intake manifold assembly according to this invention.

Referring to FIG. 2, the intake manifold assembly 14 is shown and includes the electronic throttle body 22 that provides and regulates air inlet. The intake manifold assembly 14 is comprised of a cover 42, a middle section 44 and a bottom section 46. Attached to the bottom section 46 is a carrier assembly 28. The carrier assembly 28 houses full injectors (40) (FIG. 4) for mixing fuel with air prior to being injected into the combustion chamber. The bottom section 46 includes a flange portion 47 for attachment to the vehicle engine 12. The bottom section 46 includes a fuel rail 24 that is supplied with fuel through a fuel line 36. The carrier assembly 28 includes a connector 26 to provide electrical communication between each of the several fuel injectors 40 disposed and mounted therein.

The middle section 44 includes an opening for an EGR conduit 30. The EGR conduit 30 is in communication with a source of exhaust gases 34. Exhaust gases 34 are communicated to the air intake manifold 14. The flow of exhaust gases into the intake manifold assembly 14 is controlled by an EGR valve 32. The EGR conduit 30 according to this invention provides for the proximate and decentralized injection of exhaust gases into the intake manifold assembly 14.

The decentralized communication of exhaust gases into the intake manifold assembly reduces response time, thereby providing an increase in performance. As appreciated, a centralized EGR valve would allow exhaust gases into the intake manifold at a central location, preferably an equal distance from each air passage. A delay between actuation of the EGR valve and the time that the desired gases actually reach the combustion chamber can significantly impact desired performance. Accordingly, the directed gas flow to each of the air passages 50 provides a substantial reduction in response time by communicating gas flow directly proximate each air passage 50 and thereby each combustion chamber within the engine 12. Accordingly, a substantial reduction in response time is provided by the EGR conduit 30 of this invention without modification to the EGR valve 32.

Figure 3:
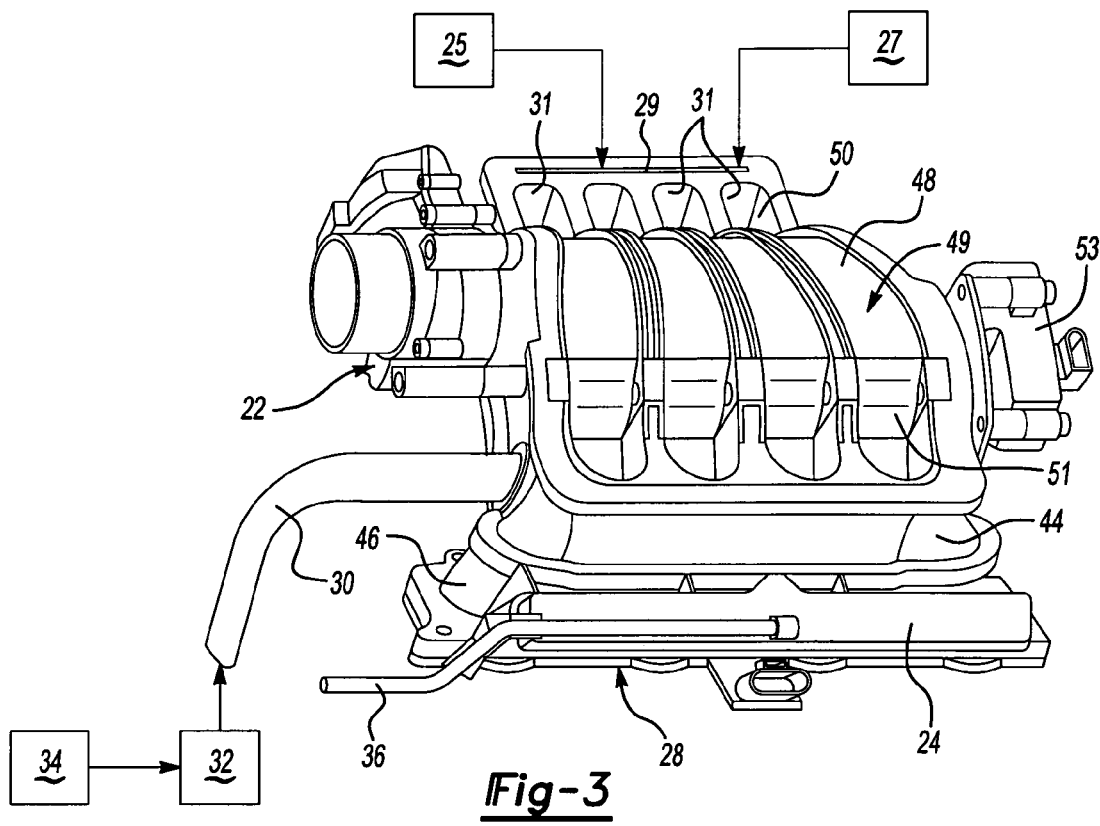
FIG. 3 is a view of internal components of an example intake manifold assembly according to this invention.

Referring to FIG. 3, the intake manifold assembly 14 is shown with the cover 42 removed to reveal the air passages 50 and the inner section 48 that defines runners 49 that define each of the air passages 50. The intake manifold assembly 14 includes a passage 29 that is in communication with a positive crankcase ventilation system 25 (PCV) and a purge gas system 27. The PCV system 25 and the purged gas system 27 communicate blow by gases from the crankcase of the engine 12 and gas vapors from the vehicle gas tank with the air passages 50. A separate opening passage 31 communicates gases from the PCV system 25 and the purged gas system 27 to each individual air passage 50 in close proximity to the end of the air passage 50 and thereby close to the engine combustion chamber. Gases from the PCV system 25 and the gas purge system 27 mix in the passage 29 and then are communicated to the each of the air passages 50 through individual opening passages 31. This direct and individual communication improves response times of each system 25, 27.

Each of the opening passages 31 includes a cross-sectional area. The cross-sectional area of the opening passages may be the same for each passage, or maybe tailored to accommodate differences in airflow through each of the air passages 50. Further, the shape of the opening may also be modified to tailor communication of gases to each of the air passages.

Figure 4:
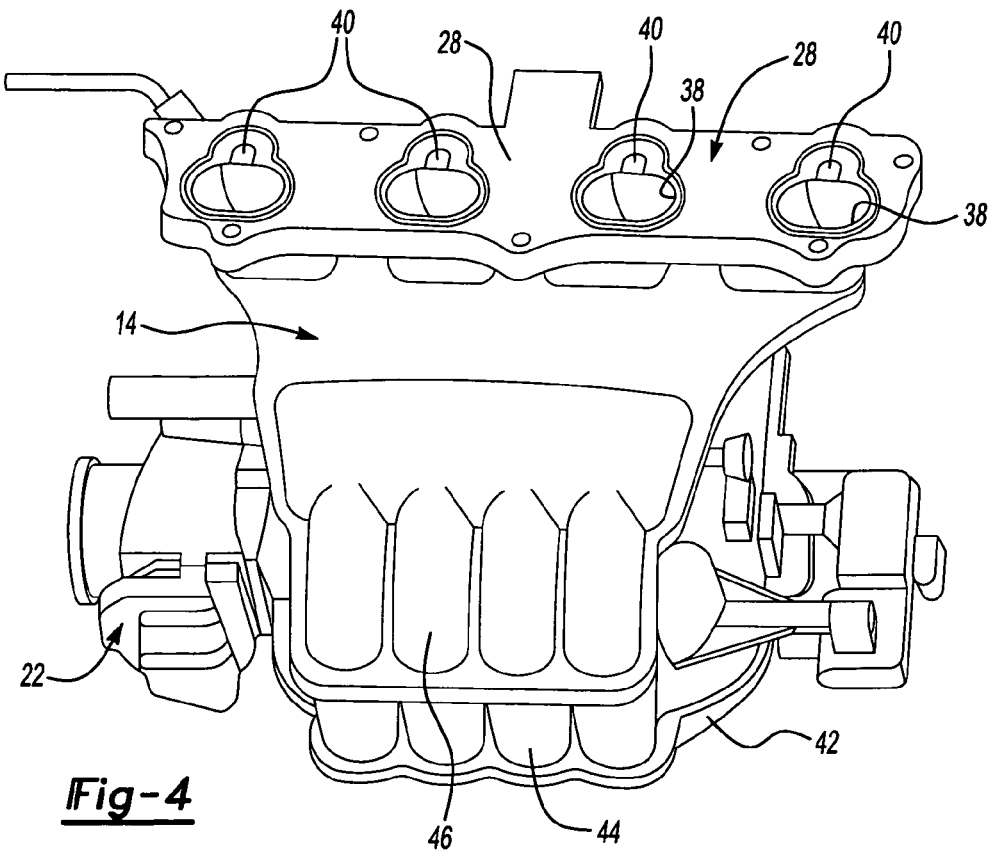
FIG. 4 is a bottom view of an example intake manifold assembly according to this invention.

Referring to FIG. 4, the intake manifold 14 is shown from the bottom view to better show the various openings 38 that terminate each of the air passages 50 that are defined by the carrier assembly 28. Through the openings 38 flows the air combined with fuel injected by each of the fuel injectors 40. Fuel injectors 40 are mounted within the carrier assembly 28 and controlled by way of a lead frame or wire harness over-molded therein. The electrical signals required for controlling the fuel injectors 40 are provided by a controller through the common connector 26. The carrier assembly 28 is fabricated from plastic and provides mounting and integration of the fuel injectors 40 proximate to each combustion chamber.

Figure 5:
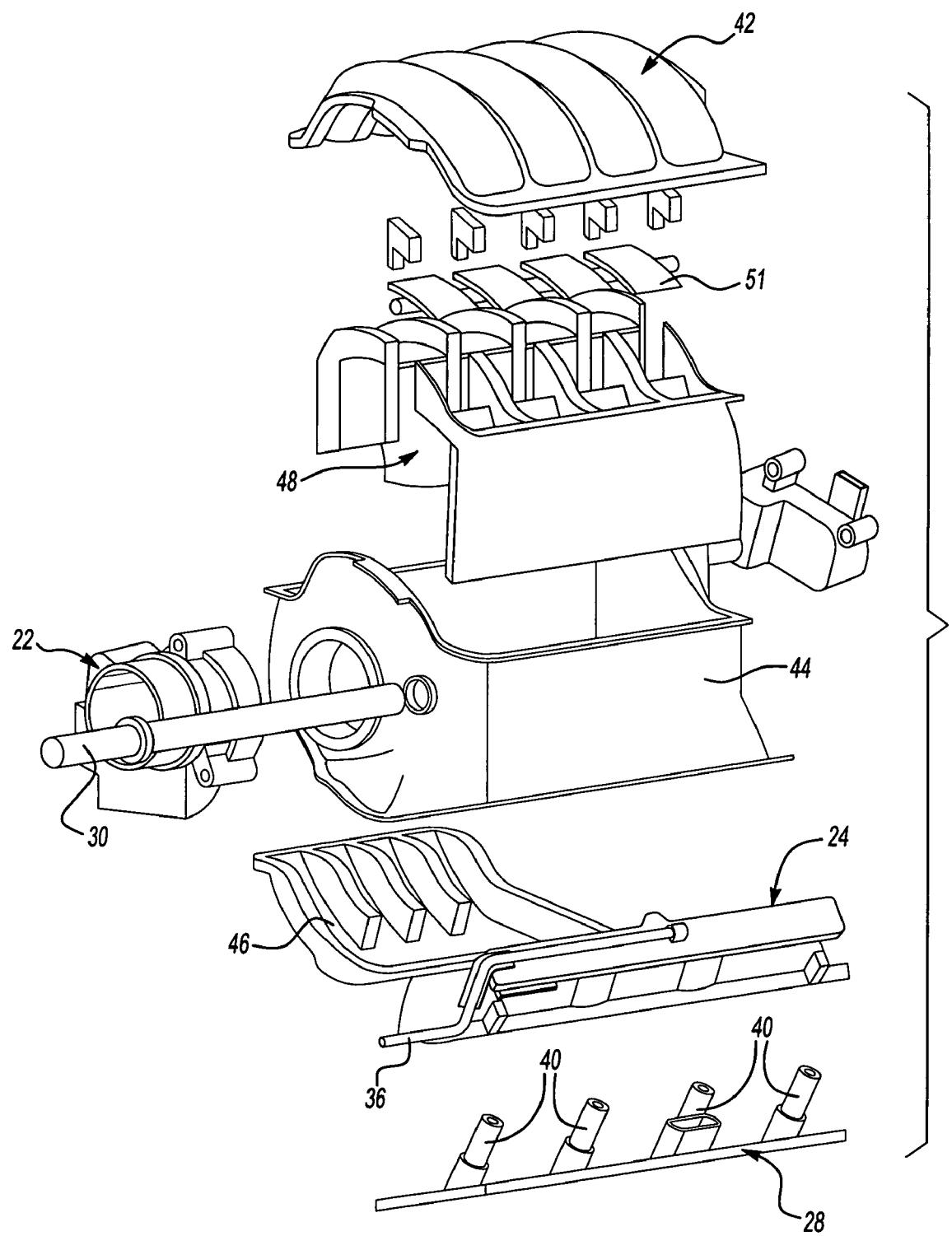
FIG. 5 is an exploded view of an air intake manifold assembly according to this invention.

Referring to FIG. 5, the air intake manifold 14 is shown in an exploded view illustrating the cover 42, the middle section 44 and the bottom section 46. The inner section 48 of the intake manifold assembly 14 provides for the definition of the various air passages 50. Each of the air passages 50 is shaped to provide the desired flow characteristics that encourage mixing of fuel and that provides the required fuel and air mixture for each of the combustion chambers. Each of the manifold sections 46, 44, and 48 define portions of the air passages 50 such that the completed manifold assembly 14 provides an integrated assembly fabricated from a plastic material. Fabrication of the intake manifold assembly 14 utilizes the several discrete sections that interfit with each other. Each of the sections 42, 44, 46, and 48 are assembled and subsequently attached to each other using methods known in the art such as ultrasonic welding and laser welding.

A tuning valve assembly is provided that includes a plurality of tuning plates 51 supported on a shaft and rotated by an actuator 53. The tuning plates 51 provide for the further control of airflow through the air passages to further control and optimize performance.

Further, the fuel rail 24 is integrated into the bottom section 46 of the air intake manifold assembly 14. The fuel rail 24 may be fabricated from a plastic material as an integral feature of the bottom section 46 or may be a separate component fabricated from a metallic material.

The EGR conduit 30 is supported into the middle section 44 and includes a plurality of openings that are in communication with each corresponding air passage 50. The EGR conduit 30 is fabricated from a material compatible with the temperatures generated by the flow of exhaust gases therethrough.

Figure 6A:
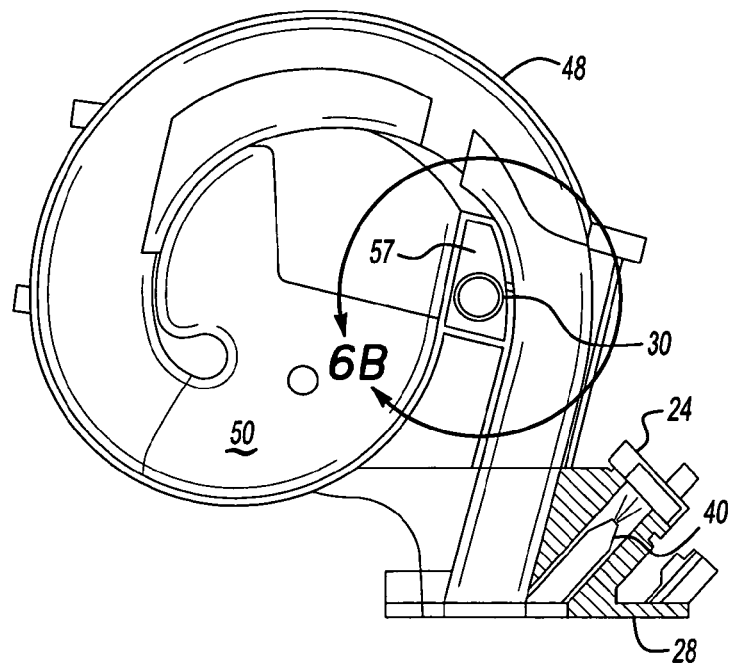
FIG. 6A is a section view of an air passage of the intake assembly according to this invention.
Figure 6B:
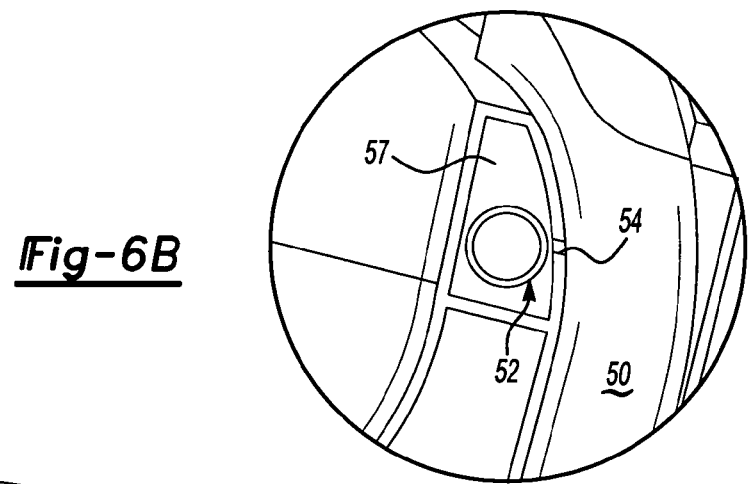
FIG. 6B is a schematic illustration of an example EGR conduit according to this invention.

Referring to FIGS. 6A, 6B, a sectional view is shown of one the air passages 50. The EGR conduit 30 is disposed across or through the inner manifold section 48 (FIG. 5D) and includes an opening 52 that is in communication with each of the air passages 50. The EGR conduit 30 supplies and communicates hot exhaust gases proximate to an end of each of the air passages 50. Expelling hot exhaust gases proximate to each of the air passages 50 provides a uniform distribution that would not otherwise be possible.

The EGR conduit 30 will reach temperatures in excess of the capability of the non-metallic intake manifold material to withstand. Accordingly, the EGR conduit 30 is fabricated from a metal material and is spaced apart from the walls of the inner manifold assembly 48. An air space 57 is disposed around the EGR conduit 30 to insulate the manifold assembly 14 from the temperatures of the exhaust gases. The air space 37 provides a desired spacing from the manifold section 48 such that the temperature of the manifold walls 48 can be regulated and maintained within acceptable limits.

Figure 6C:
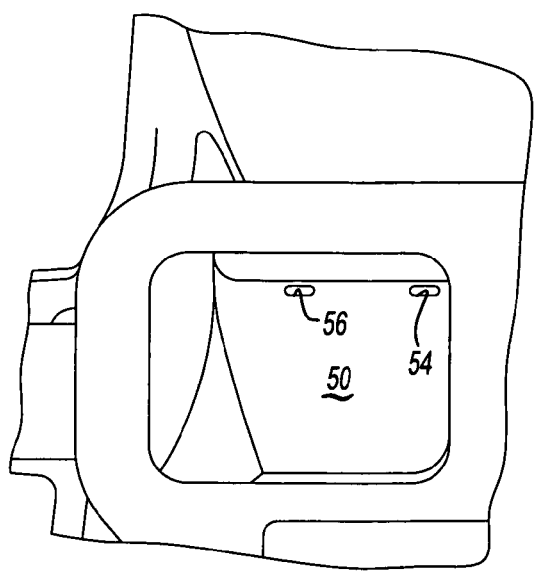
FIG. 6C is another schematic view of the example EGR conduit according to this invention.
Figure 6D:
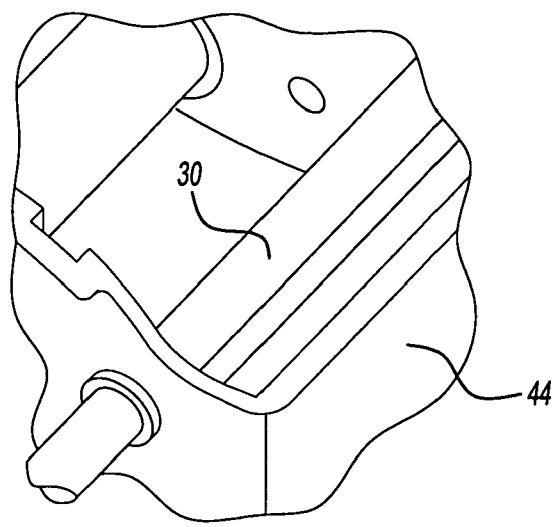
FIG. 6D is an enlarged sectional view of the example EGR conduit according to this invention.

Referring to FIG. 6D, the EGR conduit 30 shown extending through the middle section 44 of the intake manifold assembly 14. The conduit 30 extends across the intake manifold assembly 14 and is insulated at each of the manifold walls to prevent undesirable damage caused by the excessive heat communicated by way of exhaust gases within the EGR conduit 30.

Referring to FIGS. 6B and 6C, the EGR conduit 30 includes an opening 52 that corresponds with an opening 54 within each of the air passages 50. Each of the air passages 50 includes at least one opening to provide the desired exhaust airflow and communication of the desired volume of exhaust gases. As should be appreciated, flow characteristics in each of the air passages 50, although desired to be identical are nonetheless different. Differences in air flow in each of the air passages 50 can create differences in the amount of exhaust gas that is pulled into each air passage 50 and thereby each combustion chamber.

Accordingly, the opening 52 within the EGR conduit 30 and the opening 54 within the wall of the air passage 54 can be tailored to provide a uniform flow of exhaust gases into each of the air passages 50. Tailoring of exhaust airflow is provided by preferentially sizing each opening 54 with respect to airflow through the corresponding air passage 50. In some applications the openings 54 may be of equal size. However, the sizes 54 may be different for each air passage 50. Further, the combination of opening size for the opening 52 and the opening 54 may be sized such that the combination provides the desire exhaust airflow into the air passage. Further, the shape of each opening may be of any shape that provides the desired exhaust airflow characteristics.

Figure 6E:
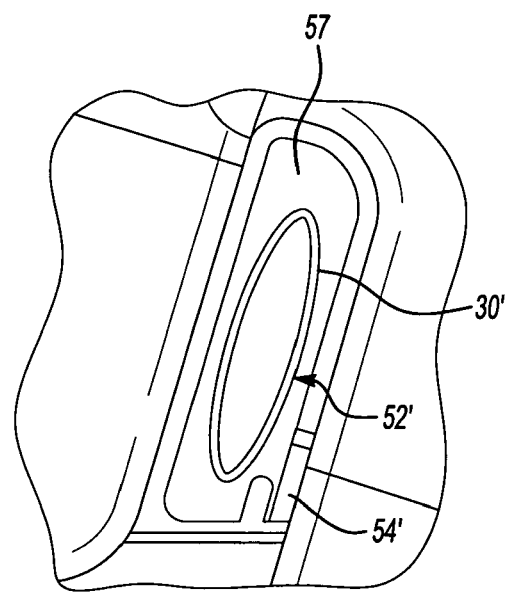
FIG. 6E is an enlarged view illustrating another example EGR conduit according to this invention.

Referring to FIG. 6E, another EGR conduit 30' according to this invention is shown with an elliptical cross-section. The elliptical shape of the EGR conduit 30' increases the surface to area ratio to provide for improved opportunities at cooling the EGR conduit 30'. The EGR conduit 30' includes an opening 52' that cooperates with the opening 54' to provide the desired exhaust flow characteristics to each of the air passages.

Figure 7A:
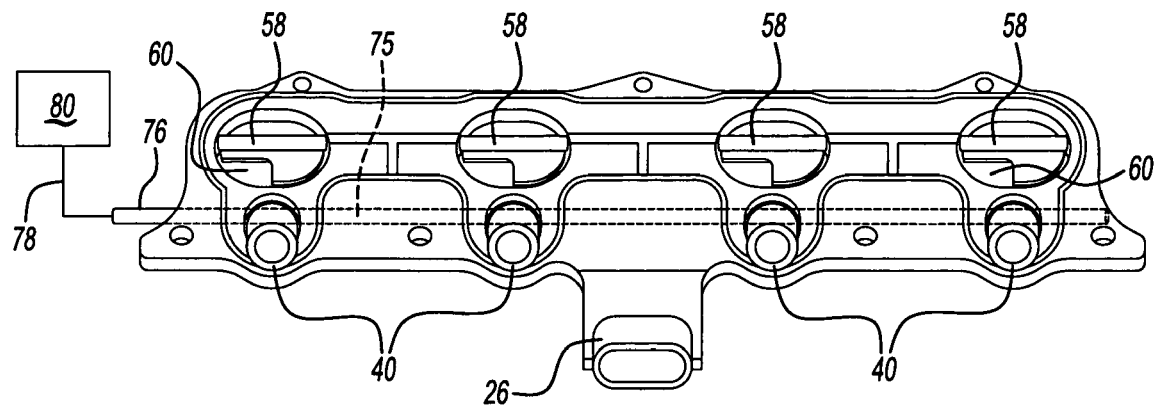
FIG. 7A is a top view of a carrier assembly according to this invention.
Figure 7B:
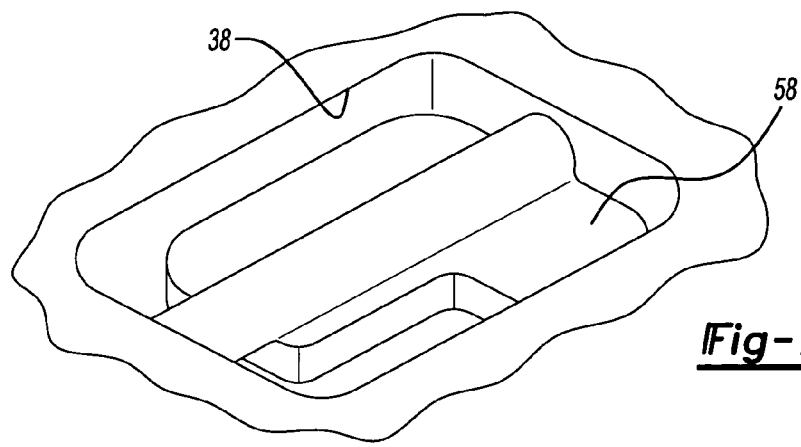
FIG. 7B is a schematic view of an air passage and swirl valve in the carrier assembly according to this invention.

Referring to FIGS. 7A, and 7B, the carrier assembly 28 includes the openings 38 through which air and fuel pass. The carrier assembly 28 includes the integrally mounted fuel injectors 40 that are supplied with fuel by way of the fuel rail 24 that is integrated into the bottom section 46 and is mounted to the bottom of the bottom section 46 between the intake manifold assembly 14 and a cylinder head of the engine 12.

Openings 38 of the carrier assembly 28 include a swirl control valve 58 for preferentially imparting a swirl in air and gas flow as it enters the combustion chamber of the engine. The swirl control valve 58 can be actuated to tailor the flow direction and characteristics of the air/flow mixture entering the combustion chamber. Each of the swirl control valves 58 include an open space 60. The open space 60 provides a minimum flow requirement into the combustion chamber to provide a minimum requirement of airflow to the combustion chamber.

Figure 7C:
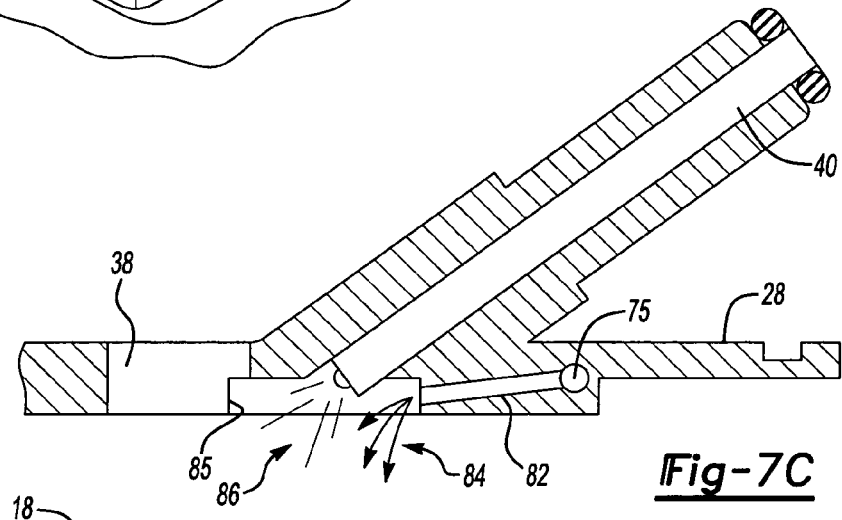
FIG. 7C is a schematic cross-sectional view of an example carrier assembly according to this invention.

Referring to FIG. 7C, the carrier assembly 28 includes an air passage 74 for communicating clean air to an opening proximate to each of the fuel injectors 40. The air passage 75 includes an inlet 76 for attachment to a conduit 78 that is communication with a source of clean air 80. Although the air passage 75 is illustrate as a single air passage, several air passages may be utilized as is required by a specific application. The clean air source 80 can be provided by tapping into a location after the filter housing 18 and before air is directed into the throttle 22. The air passage 75 communicates the clean air through an outlet 82 in communication with an annular chamber 85 at a desired pressure across an opening of each of the fuel injectors 40. The annular chamber 85 surrounds the emitting end of the fuel injector 40. The flow of clean air (schematically indicated at 84) across the fuel injector 40 atomizes fuel (schematically indicated at 86) emitted from the fuel injector 40 to improve a mixing of fuel and air. The air passage 75 is integrally molded into the carrier assembly 28. The air passage 75 is sized and shaped to provide a desired airflow rate determined to provide a desired atomization of fuel.

Figure 8:
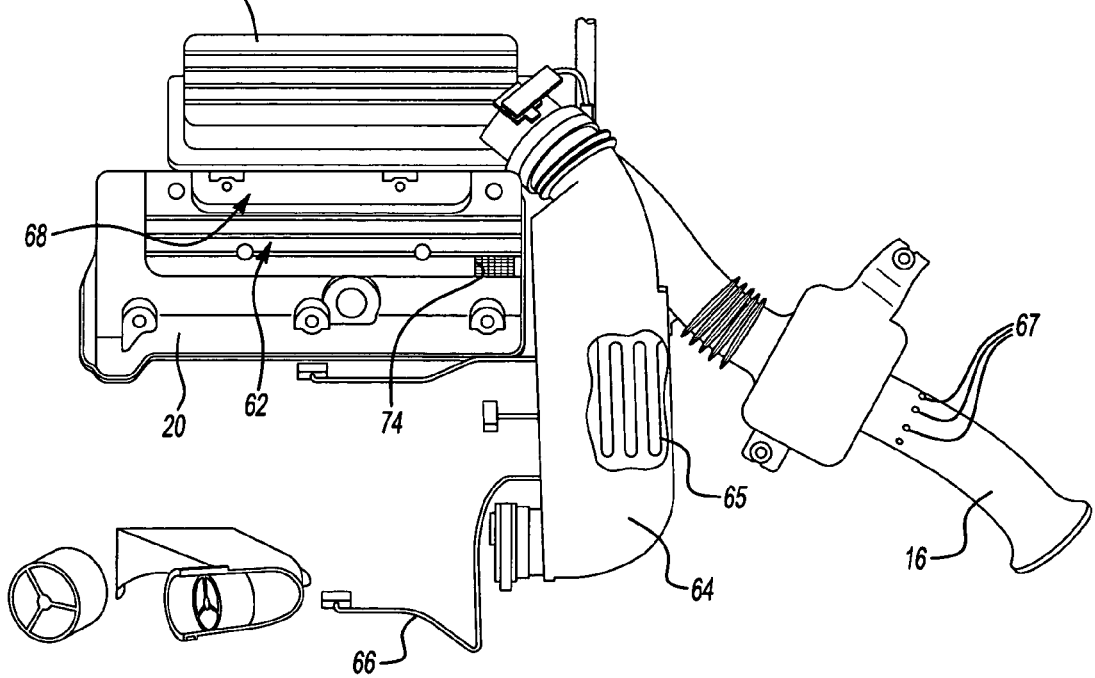
FIG. 8 is a schematic illustration of the air filter assembly according to this invention.

Referring to FIG. 8, the air filter housing 18 is illustrated includes and the fresh air tube 16 that supplies air to the air filter housing 18. A portion of the air filter housing 18 is integrally formed with portions of the valve cover 20. The valve cover 20 is bolted directly to the engine and covers cams, valves or other items that typically require a cover. Further, the valve cover 20 includes a coil plug wiring bar 62 that includes a connector 74 for communicating electrical energy to spark plugs mounted within the engine 12.

Air enters the air filter housing 18 through the fresh air tube 16 and exits through the air conduit 64 where it is communicated to the electronic throttle body 22. The air conduit 64 is molded of a non-metallic material and includes an integrally molding lead frame 65. The integrally molded lead frame 65 provides for the integration for the wiring harness 66. The wiring harness 66 includes several connectors 67. The wiring harness 66 is disposed to provide electrical communication for various systems and sensors typically utilized such as oxygen sensors, EGR sensors, and EGR valves.

The fresh air tube 16 includes a series of openings 69 along an outer periphery that provide acoustic tuning. The size and number of openings 69 incorporates an acoustic filter effect that removes a range of noise content within a specific frequency range. The openings 69 included in the fresh air tube 16 substantially eliminates the need for separate nose reduction features to simplify the overall intake assembly 10.

Figure 9:
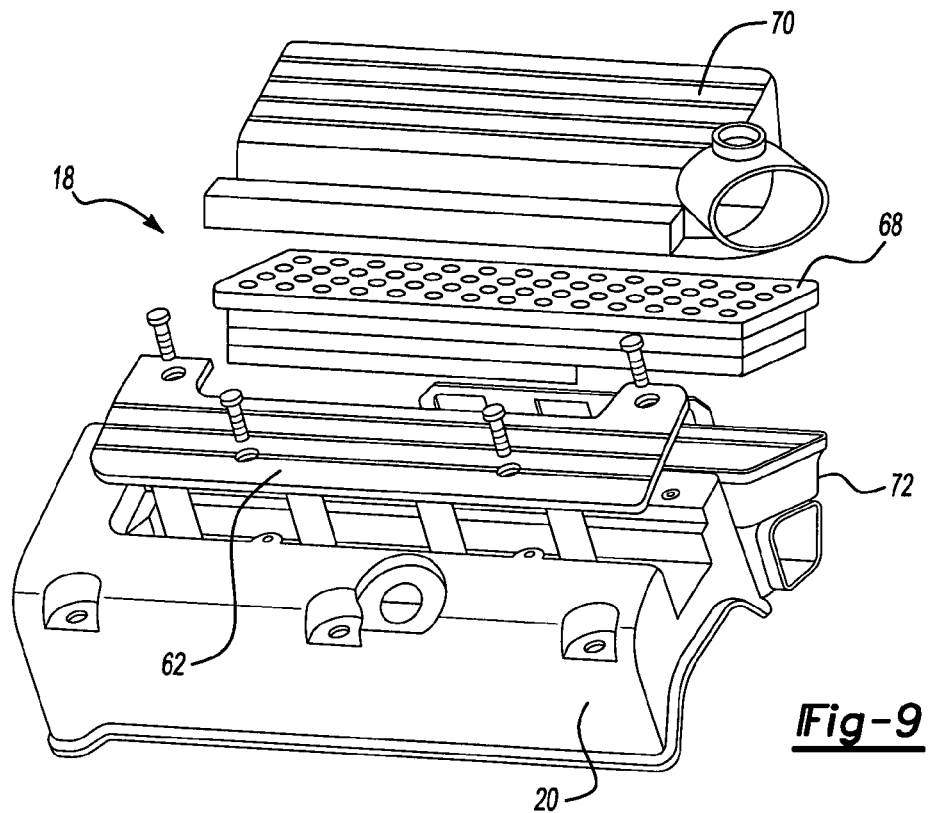
FIG. 9 is an exploded view of the air filter assembly according to this invention.
Figure 10:
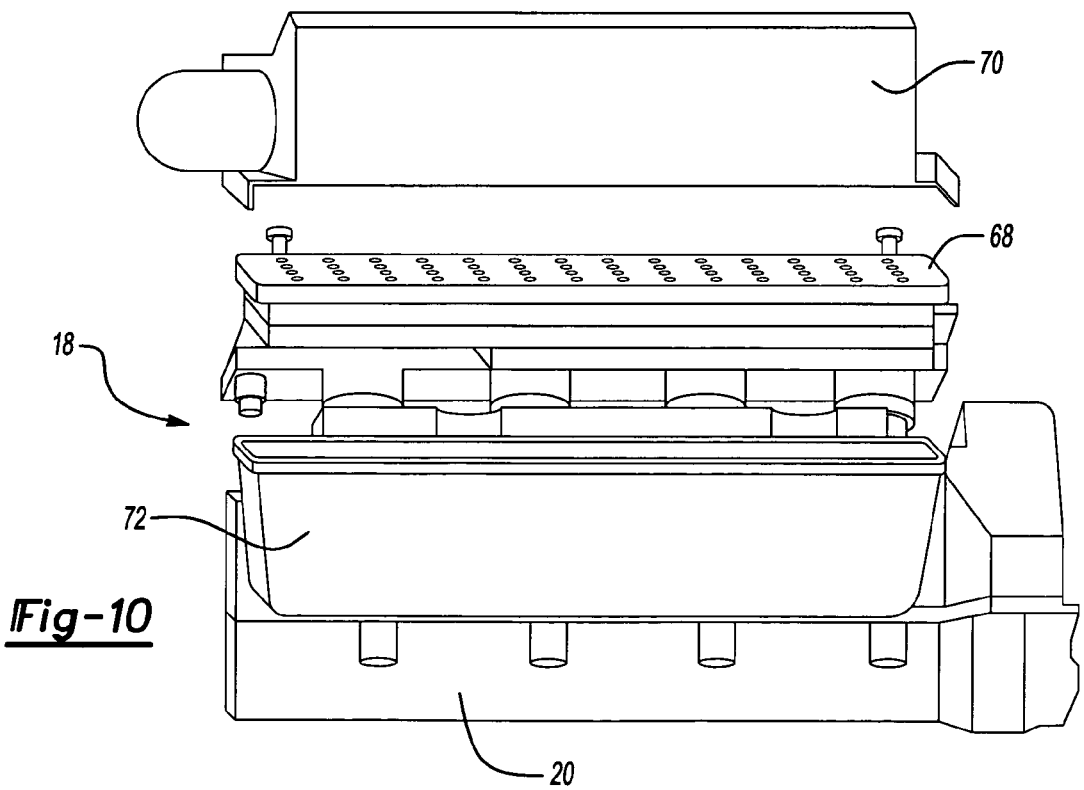
FIG. 10 is a side view of the air filter assembly according to this invention.

Referring to FIGS. 9 and 10, the air filter housing assembly 18 includes the lower portion 72 that is integral with the valve cover 20 and an cover 70. A filter 68 is placed within the lower portion 72 and the cover 70 is attached thereto. The valve cover 20 and the lower housing 72 are then bolted to the engine 12. Integration of the air filter housing 18 with the valve cover 20 provides a low profile that in turn provides additional freedom in the design and development of the engine compartment and overall vehicle configuration.

Accordingly, the intake assembly 10 illustrated and disclosed in this invention provides many integrated features that ease assembly, reduce cost and aid in manufacturability. Further, the integrated features provide several performance enhancements that are not feasible using conventional fabrication methods.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An intake system for a vehicle comprising:
   an air intake manifold comprising a plurality of air passages;
   an exhaust gas recirculating conduit in communication with a source of exhaust gas, wherein said conduit includes a plurality of openings each corresponding to one of said plurality of air passages such that exhaust gas is communicated individually proximate to each of said plurality of air passages and wherein at least one of said plurality of openings includes an area different than at least one other of said plurality of openings.

2. An air filter housing assembly for a vehicle comprising:
   a first section comprising a valve cover that is mountable to a vehicle engine;
   a base portion for supporting an air filter;
   a second section comprising a cover portion mountable to said base portion; and
   a coil plug wiring bar attached to said cover for communicating electrical signals to a spark plug of a vehicle engine, wherein said wire harness assembly includes a coil assembly.

3. An air filter housing assembly for a vehicle comprising:
   a first second comprising a valve cover that is mountable to a vehicle engine;
   a base portion for supporting an air filter;
   a second section comprising a cover mountable to said base portion; and
   a fresh air tube that directs air into the filter housing, said fresh air tube including a plurality of openings disposed circumferentially for modifying acoustic properties of air entering the filter housing assembly.

4. An intake system for a vehicle comprising:
   an air intake manifold comprising a plurality of air passages;
   a cavity disposed within the air intake manifold;
   an exhaust gas recirculating conduit disposed within said cavity and spaced apart from walls of the cavity, wherein said exhaust gas recirculating conduit is in communication with a source of exhaust gas, wherein said conduit includes a plurality of openings each corresponding to one of said plurality of air passages such that exhaust gas is communicated individually proximate to each of said plurality of air passages.

5. The system as recited in claim 4, including an exhaust gas recirculating valve that is mounted to control the flow of exhaust gases through said exhaust gas recirculating conduit.

6. The system as recited in claim 4, wherein each of the plurality of openings is tailored to provide a desired flow of exhaust gas to each of the plurality of air passages.

7. The system as recited in claim 4, wherein said conduit comprises an elliptical cross-section.

8. An intake manifold assembly comprising:
   an outer manifold section defining an inner cavity;
   an inner manifold section attached within the outer manifold section, wherein said
   inner manifold section defines a plurality of air passages; and
   a passage disposed within one of the outer manifold and the inner manifold that is in communication with at least one of a positive crankcase ventilating system and a purge gas recirculating system, wherein said passage includes a plurality of openings each in communication with at least one of said plurality of air passages and at least one of said plurality of openings is different than another of said plurality of openings for tailoring gas flow into a corresponding one of said plurality of air passages.

9. The assembly as recited in claim 8, wherein said passage is in communication with both the positive crankcase ventilating system and the purge gas recirculating system.

10. The assembly as recited in claim 8, wherein said plurality of openings include an opening area that is tailored to provide a desired gas flow into a corresponding one of said plurality of passages.

11. The assembly as recited in claim 10, wherein at least one of said plurality of openings includes a different opening area than at least one other of said plurality of openings.

12. An air filter housing assembly for a vehicle comprising:
   a first section comprising a valve cover that is mountable to a vehicle engine;
   a base portion for supporting an air filter;
   a second section comprising a cover portion mountable to said base portion; and
   a wire harness assembly integrated into at least one of the first section and the second section for communicating electrical energy to a system of the vehicle.

13. The assembly as recited in claim 12 wherein said wire harness assembly comprises a lead frame.

14. The assembly as recited in claim 13, wherein at least one of said first section and said second section are fabricated from a non-metallic material, and said lead frame is over molded at least partially within said non-metallic material.

15. The assembly as recited in claim 13, wherein said wire harness assembly communicates electrical signals to a fuel injector assembly.

16. An intake assembly for a vehicle comprising:
   a first section defining an outer surface and an inner space;
   a second section interfit within said inner space of said first section and attached to said first section defining a plurality of air passages; and
   a carrier assembly attached to one of the first and second sections, said carrier assembly supporting conduits for communicating electrical signals to a plurality of fuel injector mounted within said carrier, wherein said carrier assembly defines a plurality of openings that each include a swirl control valve for preferentially directing airflow.

17. The assembly as recited in claim 16, wherein said swirl control valve includes an open space that preferentially directs airflow when in a closed position.

18. The assembly as recited in claim 17, wherein said swirl control valve is movable to an open position such that a minimal area of each of said plurality of openings is blocked.

19. The assembly as recited in claim 16, wherein said carrier assembly includes an air passage for communicating clean air proximate each of said plurality of fuel injectors to atomize fuel emitted from each of the fuel injectors.

20. The assembly as recited in claim 19, wherein said air passage is molded within said carrier assembly.

* * * * *